US012799319B2

(12) United States Patent
Park et al.

(10) Patent No.: US 12,799,319 B2
(45) Date of Patent: Nov. 17, 2026

(54) EPOXY RESIN COMPOSITION FOR MOLDING

(71) Applicant: KCC CORPORATION, Seoul (KR)

(72) Inventors: Chan Young Park, Jeollabuk-do (KR); Myoung Taek Shim, Gwangju (KR); Eun Han Lee, Gyeonggi-do (KR); Byung Seon Kong, Gyeonggi-do (KR)

(73) Assignee: KCC CORPORATION, Seoul (KR)

( * ) Notice: Subject to any disclaimer, the term of this patent is extended or adjusted under 35 U.S.C. 154(b) by 604 days.

(21) Appl. No.: 18/282,379

(22) PCT Filed: Aug. 5, 2022

(86) PCT No.: PCT/KR2022/011664
§ 371 (c)(1),
(2) Date: Sep. 15, 2023

(87) PCT Pub. No.: WO2023/054884
PCT Pub. Date: Apr. 6, 2023

(65) Prior Publication Data

US 2024/0158628 A1 May 16, 2024

(30) Foreign Application Priority Data

Sep. 28, 2021 (KR) ........................ 10-2021-0127968

(51) Int. Cl.
*C08L 63/00* (2006.01)
*C08J 3/12* (2006.01)

(52) U.S. Cl.
CPC ............... *C08L 63/00* (2013.01); *C08J 3/126* (2013.01); *C08J 3/128* (2013.01); *C08J 2363/00* (2013.01); *C08L 2207/53* (2013.01)

(58) Field of Classification Search
CPC .................................. C08L 63/00; C08J 3/12
USPC ......................................................... 523/201
See application file for complete search history.

(56) References Cited

U.S. PATENT DOCUMENTS

| | | | | |
|---|---|---|---|---|
| 2007/0251419 A1* | 11/2007 | Yamaguchi | C08F 2/22 | 106/287.23 |
| 2011/0097568 A1* | 4/2011 | Kamae | C08G 59/3209 | 428/222 |
| 2016/0251510 A1* | 9/2016 | Furukawa | C08F 265/06 | 523/201 |
| 2021/0269689 A1 | 9/2021 | Ko et al. | | |

FOREIGN PATENT DOCUMENTS

| | | | | | |
|---|---|---|---|---|---|
| CN | 101006135 | A | | 7/2007 | |
| CN | 108140620 | A | | 6/2018 | |
| CN | 112437798 | A | | 3/2021 | |
| CN | 112449650 | A | | 3/2021 | |
| EP | 3816253 | A1 | | 5/2021 | |
| JP | 2004018803 | A | | 1/2004 | |
| JP | 2005255822 | A | | 9/2005 | |
| JP | 2006-143950 | A | | 6/2006 | |
| JP | 2009073933 | A | | 4/2009 | |
| JP | 2011-195742 | A | | 10/2011 | |
| JP | 2013151642 | A | | 8/2013 | |
| JP | 2016199738 | A | | 12/2016 | |
| JP | 2017-019988 | A | | 1/2017 | |
| JP | 6061837 | B2 | | 1/2017 | |
| JP | 2017-197620 | A | | 11/2017 | |
| JP | 2020152775 | A | | 9/2020 | |
| KR | 10-0830776 | B1 | | 5/2008 | |
| KR | 10-2017-0010577 | A | | 2/2017 | |
| KR | 101927631 | B1 | | 12/2018 | |
| KR | 20190103432 | A | | 9/2019 | |
| WO | 2006019041 | A1 | | 2/2006 | |
| WO | WO-2012105071 | A1 | * | 8/2012 | H10W 74/47 |
| WO | 2015053289 | A1 | | 4/2015 | |
| WO | WO-2017142251 | A1 | * | 8/2017 | H10W 74/40 |
| WO | WO-2018135558 | A1 | * | 7/2018 | C08L 21/00 |
| WO | 2020152775 | A1 | | 7/2020 | |

OTHER PUBLICATIONS

International Search Report from corresponding International Application No. PCT/KR2022/011664 mailed on Nov. 11, 2022, 4 pages.
Notice of Refusal for Japanese Application No. 2023-562318 mailed on Oct. 8, 2020, 14 pages with translation.

* cited by examiner

*Primary Examiner* — Deve V Hall
(74) *Attorney, Agent, or Firm* — NKL Law; Jae Youn Kim

(57) ABSTRACT

The present invention relates to an epoxy resin composition for molding, and a semiconductor device sealed using the same or a vehicle part molded using the same.

8 Claims, No Drawings

EPOXY RESIN COMPOSITION FOR MOLDING

TECHNICAL FIELD

The present invention relates to an epoxy resin composition for molding, and a semiconductor device sealed using the same or a vehicle part molded using the same.

BACKGROUND ART

As the application field of semiconductors rapidly expands centered on the automotive industry, the performance required of the semiconductors is gradually increasing, and the level of reliability evaluation to satisfy the same is also increasing. In line with the needs of the industry, the development of semiconductor constituent materials is also progressing in various ways. As an example, Japanese Patent Publication No. 2017-197620 relates to an epoxy resin composition for sealing semiconductors, the compositing including an epoxy resin, a phenol resin curing agent, and a filler, and discloses a technique of adjusting the content of the filler and the thermal modulus of a cured product of the epoxy resin composition, thereby increasing electrical reliability.

Meanwhile, in order to improve the efficiency of semiconductors, there is a trend to change typical silicon (Si) chips with silicon carbide (SiC) chips, but due to the material properties thereof, the silicon carbide chips have a disadvantage of being vulnerable to breakage caused by external impacts (heat, load, etc.) when compared to the silicon chips. In addition, for semiconductors that require high-voltage, high-temperature driving, such as power semiconductors, ceramic substrates are used to improve insulation and heat dissipation properties, but ceramic materials also have a disadvantage of being vulnerable to breakage caused by external impacts. Particularly, nitride-based ceramic (AlN, $Si_3N_4$) materials used to further improve the heat dissipation properties is more vulnerable to breakage than $Al_2O_3$ materials typically used.

In addition, in order to improve the heat dissipation properties of semiconductors, silver (Ag) sintering may be used to attach chips and substrates, or to bond between different heterogeneous materials. To this end, a technique of pre-forming a thin coating film layer made of a silver material in a portion in which a silver sintering material is used is widely used to increase bonding force with the silver sintering material. In this case, since the silver material is lower in adhesive force with an encapsulation material than a typical copper material, there is a problem in that the silver material is easily peeled by external stress. In addition, various heterogeneous materials used contract and expand at different rates from each other by the temperature change inside a semiconductor, and due to such contraction and expansion, high thermal stress is applied to the inside of the semiconductor, and the higher the internal temperature of the semiconductor, the greater the stress level. Such thermal stress may cause the peeling of a bonding portion between the heterogeneous materials inside the semiconductor, or breakage of various materials.

An epoxy resin composition is high in mechanical strength, heat resistance, electrical insulation, adhesiveness, and the like, and is an excellent material for the encapsulation of a semiconductor device, but due to the difference in the coefficient of linear expansion with a semiconductor material or a device, curing shrinkage, and the like, or residual stress is generated inside an encapsulant under high-temperature conditions such as reflow, so that there is a problem in that the peeling of an interface, cracking, and the like occur at the interface with a substrate or a device to be encapsulated.

Meanwhile, an epoxy resin composition may be used as a molding material for vehicle parts, and specifically, may be used to fill or fix the parts. Such a molding material of a vehicle part is required to be stable against vibration and heat generated during the driving of a vehicle, and in some cases, is required to withstand deformation or breakage caused by high-speed rotation.

In order to solve the problem, a technique of applying various stress relievers to an epoxy resin composition for molding has been developed. When a carboxylic acid anhydride-based material is applied as a stress reliever, a low-stress effect may be imparted inside of a composition, but it is difficult to achieve dispersion in the resin composition, and there is a disadvantage in that mold workability of the resin composition is deteriorated. Meanwhile, silicone oils, which is another type of a stress reliever, have a limited amount of use since the silicone oils may affect the appearance by generating a flow mark or the like on the surface of a molding material as the amount of use thereof increases, and silicone resins have a disadvantage of being expensive while having an insignificant low-stress effect. In addition, silicon powders has an excellent low-stress effect, but may cause breakage of a molding material by lowering strength of a resin composition.

Therefore, there is a need to develop an epoxy resin composition for molding having a further improved balance between heat resistance, peeling resistance, thermal impact resistance, moisture resistance reliability, and internal stress relief.

DISCLOSURE OF THE INVENTION

Technical Problem

The present invention provides an epoxy resin composition for molding which achieves a high level of compatibility of heat resistance, low-stress properties, and moisture resistance reliability, and which has excellent handling properties and reproducibility of properties. In addition, the present invention provides a semiconductor device sealed using the epoxy resin composition or a vehicle part molded using the same.

Technical Solution

The present invention provides an epoxy resin composition including an epoxy resin, a curing agent, a filler, and a stress reliever, wherein the particle size of the stress reliever agglomerated in a kneaded product prepared by melt-kneading the epoxy resin composition is 1,500 nm or less.

Advantageous Effects

An epoxy resin composition of the present invention achieves stable dispersion by appropriately controlling the particle size of a stress reliever agglomerated in a kneaded product after knead-melting, and thus, has an effect in that the thermal stress of constituent materials of a material to be molded or between the constituent materials is relieved, thereby preventing the occurrence of peeling between the constituent materials of the material to be molded or cracking, and the breakage of the material to be molded or the constituent materials.

In addition, the epoxy resin composition according to the present invention may improve the heat resistance, low-stress properties, and moisture resistance of a semiconductor device or vehicle part sealed using the same, thereby providing high reliability.

BEST MODE FOR CARRYING OUT THE INVENTION

Hereinafter, the present invention will be described in detail.

However, the scope of the present invention is not limited only by the following description, and if necessary, each component may be variously modified or selectively mixed and used. Therefore, it is to be understood that all changes, equivalents, and alternatives falling within the spirit and scope of the present invention are intended to be included.

As used herein, the "particle size" is measured by a typical method known in the art, and can be measured by, for example, laser light scattering (LLS). The "glass transition temperature" is measured by a typical method known in the art, and can be measured by, for example, by thermomechanical analysis (TMA) or differential scanning calorimetry (DSC). The "viscosity" is measured by a typical method known in the art, and can be measured using, for example, a capillary flowmeter tester (CFT) or a Brookfield viscometer.

<Epoxy Resin Composition>

An epoxy resin composition according to the present invention includes an epoxy resin, a curing agent, a filler and a stress reliever, wherein the particle size of the stress reliever agglomerated in a kneaded product obtained by melt-kneading the epoxy resin composition is controlled to 1,500 nm or less to effectively disperse the kneaded product, and furthermore, the stress reliever inside a molding material, thereby imparting low-stress properties. As a result, when a semiconductor device is sealed or a vehicle part is molded using the epoxy resin composition, it is possible to secure a balance between heat resistance, peeling resistance, thermal shock resistance, moisture resistance reliability, and internal stress relief. At this time, the particle size of the agglomerated stress reliever may be measured using a scanning electron microscope (SEM).

To impart additional functions as necessary within a range in which the properties of the epoxy resin composition of the present invention are not impaired, the epoxy resin composition of the present invention may further include one or more various additives typically used in the art, such as a curing accelerator, a coupling agent, a colorant, a release agent, a modifier, and a flame retardant.

Epoxy Resin

In the present invention, the epoxy resin composition is used as a main resin, and reacts with a curing agent to be cured, and then forms a three-dimensional network structure, so that it is possible to impart strong and firm adhesion to an adherend and heat resistance.

As the epoxy resin, an epoxy resin typically used in the art may be used, and for example, an epoxy resin including two or more epoxy groups in the molecular structure thereof may be used. Non-limiting examples of the epoxy resin which may be used include a bisphenol A-type epoxy resin, an alicyclic-type epoxy resin, a cresol novolac-type epoxy resin, a dicyclopentadiene-type epoxy resin, a biphenyl-type epoxy resin, a naphthalene-type epoxy resin, an anthracene-type epoxy resin, a non-condensed cyclic polycyclic structure epoxy resin, a bisphenol fluorene-modified epoxy, and the like, and the epoxy resin may include one or more thereof.

The soft point of the epoxy resin may be 40° C. to 130° C., for example, 50° C. to 120° C. When the soft point of the epoxy resin is within the aforementioned range, a kneaded product having good properties may be obtained during a preparation process using a kneader, a roll mill, or the like. Specifically, when the soft point of the epoxy resin is greater than the aforementioned range, melt-kneadability during the preparation process is lowered, resulting in lower uniformity of the prepared epoxy resin composition, and due to high viscosity, it becomes difficult to secure fillability when molding a molding material. Meanwhile, when less than the aforementioned range, a caking phenomenon occurs in the prepared epoxy resin composition, resulting in low storability, and when used, due to low viscosity, the epoxy resin composition excessively flows out through gaps in a mold, which may cause equipment contamination, and also, may cause appearance defects such as voids and flashes inside and outside a molding material.

As the epoxy resin, an epoxy resin having an epoxy equivalent weight (EEW) of 100 g/eq to 400 g/eq, for example, 150 g/eq to 350 g/eq, and a viscosity (based on 150° C.) of 0.01 poise to 50 poise, for example, 0.01 poise to 10 poise, or for another example, 0.01 poise to 5 poise may be used. An epoxy resin that satisfies the aforementioned properties has relatively low-viscosity properties, and thus, may secure spiral flow even when a high content of filler is included, and kneading is facilitated.

Based on the total weight of the epoxy resin composition, the content of the epoxy resin may be 2 wt % to 20 wt %, for example 5 wt % to 15 wt %. When the content of the epoxy resin is less than the aforementioned range, the adhesiveness, spiral flow, and moldability thereof may be degraded, and when greater than the aforementioned range, due to the increase in the amount of moisture absorption, the reliability of a molding material may become poor, and due to the relative decrease in the filler content, the strength may be degraded.

Curing Agent

The epoxy resin composition according to the present invention includes a curing agent. The curing agent serves to advance curing of the composition by reacting with the epoxy resin.

As the curing agent, a curing agent known in the art as having a curing reaction with an epoxy resin may be used, and as an example, the curing agent may be a phenolic compound having two or more phenolic hydroxyl groups in one molecule. For example, the curing agent may include one or more selected from the group consisting of a phenol novolac resin, a cresol novolac resin, a phenol aralkyl resin, and a polyfunctional phenol compound.

The curing agent may have a soft point of 50° C. to 110° C., for example, 60° C. to 100° C. When the soft point of the curing agent is within the aforementioned range, a melt-kneaded product having good properties may be obtained during a preparation process using a kneader, a roll mill, or the like. When the soft point of the curing agent is greater than the aforementioned range, melt-kneadability during the preparation process is lowered, resulting in lower uniformity of the prepared epoxy resin composition, and due to high viscosity, it becomes difficult to secure fillability when molding a molding material. Meanwhile, when less than the aforementioned range, a caking phenomenon occurs in the prepared epoxy resin composition, resulting in low storability, and when used, due to low viscosity, the epoxy resin composition excessively flows out through gaps in a mold, which may cause equipment contamination, and also, may cause appearance defects such as voids and flashes inside and outside a molding material.

As the curing agent, a curing agent having a hydroxyl equivalent weight of 80 g/eq to 300 g/eq, for example, 100 g/eq to 230 g/eq, and a viscosity (based on 150° C.) of 0.01 poise to 10 poise, for example, 0.01 poise to 8 poise may be used. Based on the total weight of the epoxy resin composition, the content of the curing agent may be 1 wt % to 20 wt %, for example 3 wt % to 10 wt %. When the content of the curing agent is less than the aforementioned range, the curability and moldability thereof may be degraded, and when greater than the aforementioned range, due to the increase in the amount of moisture absorption, the reliability of a molding material may become poor and the strength may be degraded.

The mixing ratio of the epoxy resin and the curing agent may be adjusted according to the degree of mechanical properties and reliability required of a molding material, and the epoxy resin and the curing agent may be mixed at an equivalent weight ratio of, for example, 1:0.6 to 1.3. When the equivalent weight ratio of an active group of the curing agent to the epoxy group is less than the aforementioned range, the curing rate of the resin composition may decrease, and when greater than the aforementioned range, the strength of a cured product may be reduced. In addition, when the equivalent weight ratio is out of the aforementioned range, high-temperature thermal decomposition due to an unreacted epoxy group or curing agent may occur.

Filler

The epoxy resin composition according to the present invention includes a filler. The filler improves the mechanical properties (e.g., strength) of the epoxy resin composition, and serves to lower the amount of moisture absorption.

As the filler, any inorganic filler typically used in the art may be used without limitation, and for example, an inorganic filler such as silica, silica nitride, alumina, aluminum nitride, boron nitride, or the like may be used, and any one thereof may be used alone, or in combination of two or more thereof. The shape of the filler is not particularly limited, and both angular and spherical shapes may be used.

The particle diameter of the filler is not particularly limited, and may be, for example, in the range of 5 μm to 30 μm. In addition, when considering the fillability inside a mold, the maximum particle diameter of the filler may be 250 μm or less, for example, 180 μm or less.

Based on the total weight of the epoxy resin composition, the content of the filler may be 63 wt % to 91 wt %, for example 65 wt % to 90 wt %. When the content of the filler is less than the aforementioned range, the amount of moisture absorption in a cured product of the epoxy resin composition may increase, resulting in degraded reliability of a molding material, and when greater than the aforementioned range, the fluidity may be degraded, resulting in poor moldability.

Stress Reliever

The epoxy resin composition according to the present invention includes a stress reliever to improve impact resistance by imparting low-stress properties.

The stress reliever may have a core-shell structure, and in this case, a core component is not dissolved in the epoxy resin composition, so that the degradation in heat resistance (glass transition temperature) may be suppressed to reduce stress, and a shell component has excellent compatibility and affinity with respect to the epoxy resin composition, and thus, may be dispersed well.

As the core of the stress reliever, a core having rubber elasticity and being insoluble in an epoxy resin may be used, and examples thereof may include butadienes such as polybutadiene, isoprene, and chloroprene, butadiene copolymers such as butadiene-styrene, (meth)acrylates such as butyl (meth)acrylate, 2-ethylhexylacrylate, and laurylmethacrylate, siloxanes, or the like, and any one thereof may be used alone, or in combination of two or more thereof.

The shell of the stress reliever serves to improve affinity between the epoxy resin and components constituting the core, and may be formed in the form of being graft-polymerized (bonded) to the core. In order to be stably dispersed in the epoxy resin composition, a shell having swelling properties, compatibility, or affinity with the epoxy resin may be used. As an example, the shell may include (meth)acrylates such as methyl (meth)acrylate, acrylate copolymers such as copolymers with styrene, and the like, and may include any one thereof alone or in combination of two or more thereof. A (co)polymer constituting the shell may be surface-treated with an organic/inorganic functional group to improve dispersibility. Non-limiting examples of the organic/inorganic functional group may include an organic functional group such as a hydroxyl group, a methyl group, and an ethyl group, and an inorganic functional group such as a silane group.

The individual particle size of the stress reliever may be 500 nm or less, for example, 20 nm to 500 nm, and for another example, 20 nm to 400 nm. When the particle size is within the aforementioned range, the stress reliever may be well dispersed in a kneaded product. When the particle size is less than the aforementioned range, the viscosity of the epoxy resin composition may increase, resulting in a problem such as non-filling of a molding material, and when greater than the aforementioned range, agglomerated particles may prevent low-stress properties from being sufficiently expressed, and mechanical properties such as strength may be reduced.

The stress reliever is dispersed in a kneaded product prepared by melt-kneading the epoxy resin composition, but some of the stress reliever may be present in the form of being agglomerated. At this time, the particle size of the agglomerated stress reliever may be 1,500 nm or less, for example, 10 nm to 1,500 nm, and for another example, 50 nm to 1,000 nm. When the size of the agglomerated particle in the kneaded product is greater than the aforementioned range, low-stress properties may not be sufficiently expressed, and mechanical properties such as strength may be degraded. On the other hand, when the size of the agglomerated particle is less than the aforementioned range, spiral flow may be reduced.

Before being introduced into the epoxy resin composition, the stress reliever is present in the form of a particle having a size of tens to hundreds of microns obtained by the agglomeration of individual particles having a size of 500 nm or less. When the stress reliever agglomerated into the particle having a size of tens to hundreds of microns is present inside a molding material without being dispersed, effective low-stress properties are not exhibited, which may result in a problem of degradation in impact resistance, such as cracking caused by external stress.

Therefore, the present invention is to allow a stress reliever to be properly dispersed in a molding material so as to impart sufficient low-stress properties, and specifically, the particle size of a stress reliever agglomerated in a kneaded product prepared by melt-kneading an epoxy resin composition is adjusted to be 1,500 nm or less to impart low-stress properties and impact resistance, thereby providing a molding material having excellent reliability.

As an example, the particle size may be controlled by introducing a stress reliever simultaneously with an epoxy resin, a curing agent, a filler, and the like into an epoxy resin composition and melt-kneading the mixture. Meanwhile, when it is difficult to sufficiently control the particle size of an agglomerated stress reliever only by melt-kneading, a two-step kneading may be performed in which a pre-dispersion resin composition is formed by pre-dispersing all or some of a stress reliever in a resin for pre-dispersion, and then the pre-dispersed resin composition is introduced into an epoxy resin composition with other constituent components. At this time, as the resin for pre-dispersion, some or all of one or more of the epoxy resin and the curing agent may be used.

As an example, some or all of the stress reliever may be pre-dispersed in some or all of the epoxy resin, and then introduced into an epoxy resin composition including a remaining amount of the epoxy resin, a remaining amount of the stress reliever, a curing agent, a filler, and the like. As another example, some or all of the stress reliever may be pre-dispersed in some or all of the curing agent, and then introduced into an epoxy resin composition including an epoxy resin, a remaining amount of the stress reliever, a remaining amount of the curing agent, a filler, and the like.

As an example, the resin for pre-dispersion is melted at a temperature (e.g., 150° C.) equal to or higher than the soft point of the corresponding resin, and then all or some of a stress reliever is rotated at a high speed using a stirrer to be pre-dispersed. If necessary, during the pre-dispersion, the stirring temperature may be further raised or the stirring rate may be increased to control the size of the agglomerated stress reliever to be 1,500 nm or less. In the pre-dispersion process, the dispersion temperature may be controlled to be 200° C. or lower, and when higher than 200° C., the resin may be subjected to carbonization.

In the pre-dispersion process, the stress reliever may be included in an amount of 5 wt % to 50 wt %, for example, 10 wt % to 30 wt %, based on the total weight of the pre-dispersed resin composition. When the content of the stress reliever in the pre-dispersion resin composition is less than the aforementioned range, the amount of the stress reliever in the epoxy resin composition may be limited, and when greater than the aforementioned range, the viscosity of the pre-dispersion resin composition increases, resulting in degraded molding properties and moldability, and reduced dispersibility.

Based on the total weight of the epoxy resin composition, the content of the stress reliever may be 0.5 wt to 10 wt %, for example, 1 wt % to 5 wt %. When the content of the stress reliever is less than the aforementioned range, the low-stress effect may not be sufficiently expressed, and when greater than the aforementioned range, mechanical properties such as strength may be reduced, or thermal properties such as glass transition temperature and thermal expansion coefficient may be reduced.

Curing Accelerator

The epoxy resin composition according to the present invention may further include a curing accelerator. The curing accelerator serves to promote a curing reaction as well as improve high-temperature reliability and the cycle of continuous workability.

As the curing accelerator, a curing accelerator typically used in the art to promote a curing reaction may be used without limitation. For example, an imidazole compound such as 2-methylimidazole, 2-ethyl-4-methylimidazole, and 2-phenylimidazole, an amine compound such as triethylamine, tributylamine, and benzyldimethylamine, a tertiary amine compound such as 2-(dimethylaminomethyl)phenol, 2,4,6-tris(dimethylaminomethyl)phenol, and 1,8-diazabicyclo(5,4,0)undec-7-ene, an organic phosphine compound such as phenylphosphine, diphenylphosphine, triphenylphosphine, tributylphosphine, and tri(p-methylphenyl) phosphine, or the like may be used, and any one thereof may be used alone or in combination of two or more thereof.

Based on the total weight of the epoxy resin composition, the content of the curing accelerator may be 0.05 wt % to 1 wt %, for example 0.05 wt % to 0.5 wt %. When the content of the curing accelerator is less than the aforementioned range, curability may be degraded, and when greater than the aforementioned range, spiral flow may be degraded due to overcuring.

Additive

The epoxy resin composition according to the present invention may additionally include additives commonly used in the art to the extent of imparting a specific function or effect, not deviating from the purpose, and not impairing the properties of the epoxy resin composition of the present invention. Non-limiting examples of usable additives include a coupling agent, a colorant, a release agent, a modifier, a flame retardant, or a mixture of two or more thereof.

The epoxy resin composition of the present invention exhibits excellent flame retardancy by itself due to a high filler content, but may further include a flame retardant to further improve the flame retardancy. As the flame retardant, a metal hydrate; a phosphorus and nitrogen-containing organic compound (for example, resorcphinol diphoshate, phosphate, phenoxyphosphazene, melamine cyanurate, and a phenolic melamine resin), and the like may be used alone or in a mixture of two or more thereof, but the embodiment of the present invention is not limited thereto.

A coupling agent is added for stable dispersion of an organic material and an inorganic material, and as the coupling agent, epoxy silane, amino silane, mercapto silane, acrylic silane, vinyl silane, or the like may be used.

In addition, an additive such as a colorant (e.g., carbon black, bengala, etc.) for imparting a color to the resin composition, an ion scavenger (e.g., a hydrotalcite-based one), a release agent such as a long-chain fatty acid, a metal salt of a long-chain fatty acid, paraffin wax, and carnauba wax, a modifier, a modified silicone resin, or the like may be further included.

The additives may be added within a content range known in the art, and as an example, may each be included in an amount of 0.05 wt % to 5 wt % based on the total weight of the epoxy resin composition, but are not limited thereto.

The epoxy resin composition according to the present invention may be prepared by a method typically known in the art, for example, a melt-kneading method using a banbury mixer, a kneader, a roll, a uniaxial or biaxial extruder, a co-kneader, or the like. For example, an epoxy resin composition in which each of the components described above are uniformly mixed is melt-mixed at a temperature of 80° C. to 130° C. using a heat kneader, cooled to room temperature, and then pulverized into a powder state, and the powder was subjected to a sieving process to obtain a kneaded product.

The epoxy resin composition for molding according to the present invention may express excellent heat resistance, peeling resistance, and an effect of reducing internal stress through good dispersion of a stress reliever by controlling the particle size of the stress reliever agglomerated in the kneaded product.

Particularly, the epoxy resin composition for molding according to the present invention has low-stress properties due to an appropriately dispersed stress reliever, and may have an elastic modulus (30° C.) of 11 GPa to 20 GPa. As a result, the low-stress epoxy resin composition of the present invention has an effect of suppressing cracking and breakage caused by external stress, and thus, may provide high reliability to semiconductor devices encapsulated using the same or vehicle parts molded using the same.

The epoxy resin composition according to the present invention may have a spiral flow of 15 inches to 100 inches, for example 20 inches to 80 inches, measured after molding the prepared kneaded product in a heat transfer molding device (pressure 70 kg/cm$^2$, temperature 175° C., curing duration 120 seconds) using a spiral flow mold. When the spiral flow is less than the aforementioned range, flowability and fluidity are degraded, so that a molded body may not be molded into a desired shape, or the surface thereof may not be formed to be smooth, when greater than the aforementioned range, an epoxy resin composition excessively flows out through gaps in a mold, which may cause equipment contamination, and also, may cause appearance defects such as voids and flashes inside and outside a molding material.

Depending on an aspect thereof used, the epoxy resin composition of the present invention may process the kneaded product into a preferred form and prepare the same into a powder form, a granule form, or a sheet form. Particularly, the epoxy resin composition of the present invention suppresses the bending or deformation of a material to be molded, and thus, may be used for molding a power semiconductor.

Particularly, the epoxy resin composition for molding of the present invention may be applied to semiconductor packaging for power modules that are frequently exposed to harsh conditions (high power, high pressure), and power semiconductor packaging. In addition, the epoxy resin composition for molding of the present invention may be applied to highly-integrated semiconductor packages, and semiconductor packages made of heterogeneous materials such as silicon carbide (Si—C) and nitride-based ceramics (AlN, $Si_3N_4$).

In addition, the epoxy resin composition for molding of the present invention may be applied as a molding material for vehicle parts which require excellent vibration resistance, heat resistance, dimensional stability, and deformation resistance, and may be used to fill or fix the parts.

<Semiconductor Device and Vehicle Part>

The present invention provides a semiconductor device encapsulated using the epoxy resin composition described above. The semiconductor device may be a transistor, a diode, a microprocessor, a semiconductor memory, a power semiconductor, or the like. A method for encapsulating a semiconductor device using the epoxy resin composition of the present invention may be performed by a typical method in the art, such as a molding method of transfer mold, compression mold, injection mold, or the like.

In addition, the present invention provides a vehicle part molded using the aforementioned epoxy resin composition. As an example, the aforementioned epoxy resin composition may be used as a molding material to fix, and seal components inside a vehicle part, and specifically, a permanent magnet may be inserted into an empty space formed in a rotor core, and the epoxy resin composition of the present invention may be filled between the empty space and the permanent magnet to fix the permanent magnet in the rotor core.

Hereinafter, the present invention will be described in more detail with reference to examples. However, the following examples are merely illustrative of the present invention and are not intended to limit the scope of the present invention.

MODE FOR CARRYING OUT THE INVENTION

Preparation Example 1: Preparation of Stress Reliever Pre-Dispersion Resin (E-1)

75 parts by weight of an ortho cresol novolac-type epoxy resin (A-1) was dissolved in a reactor at 150° C., and then a dispermat was fixed at 700 rpm, and 25 parts by weight of a stress reliever (D-2) was divided into three batches and slowly introduced for 10 minutes. Thereafter, high-speed stirring was performed for 60 minutes by increasing the rpm to 2,000 while maintaining the temperature at 150° C. The dispersion degree and particle size of the stress reliever were measured through an electron microscope by sampling a pre-dispersion resin, and when the particle size was greater than 500 nm, the temperature was raised to 175° C. or the stirring rate was increased to 3,000 rpm, or the pre-dispersion was performed by applying both conditions to measure the particle size every 30 minutes. When the particle size became 500 nm or less, the stirring was terminated and the stress reliever pre-dispersion resin was discharged immediately to be solidified.

Preparation Example 2: Preparation of Stress Reliever Pre-Dispersion Resin (E-2)

A stress reliever pre-dispersion resin was prepared in the same manner as in Preparation Example 1, except that a stress reliever (D-1) was used instead of the stress reliever (D-2).

Preparation Example 3: Preparation of Stress Reliever Pre-Dispersion Resin (E-3)

A stress reliever pre-dispersion resin was prepared in the same manner as in Preparation Example 1, except that a phenol novolac-type curing agent (B-1) was used instead of the epoxy resin (A-1).

Experimental Examples 1 to 13

An epoxy resin composition of each experimental example was prepared by blending each component according to the composition described in each of Tables 1 and 2 below. The epoxy resin composition of each experimental example was melt-mixed at a temperature of 90° C. to 130° C. using a heat kneader, cooled to room temperature, and then pulverized into a powder state, and the powder was subjected to a sieving process of 20 mesh and 80 mesh to obtain a kneaded product. Using a scanning electron microscope (SEM, FEI, QUANTA 3D FEG), the particle size of the stress reliever agglomerated in the kneaded product of the epoxy resin composition prepared in each experimental example was measured. The magnification of the SEM was changed from 10,000 times to 50,000 times depending on the size of the agglomerated particle. The size of the agglomerated stress reliever observed from cross-sectional SEM images of 10 locations randomly selected for each experimental example was measured, and the maximum size of the measured sizes was set as the particle size of the agglomerated stress reliever and is shown in Tables 1 and 2 below.

TABLE 1

| Component (Unit: wt %) | | Experimental Example 1 | Experimental Example 2 | Experimental Example 3 | Experimental Example 4 | Experimental Example 5 | Experimental Example 6 | Experimental Example 7 |
|---|---|---|---|---|---|---|---|---|
| Epoxy resin (A) | A-1 | 6.48 | 0.35 | 7.8 | 7.8 | 7.8 | 7.8 | 0.35 |
| Curing agent (B) | B-1 | 3.52 | 3.65 | 4.2 | 4.2 | 4.2 | 1.2 | 3.65 |
| Filler (C) | C-1 | 84 | 84 | 82 | 75 | 83 | 83 | 84 |
| Stress reliever (D) | D-1 | 2 | | 2 | 9 | 1 | | |
| | D-2 | | | | | | | |
| | D-3 | | | | | | | |
| | D-4 | | | | | | | |
| Pre-dispersion resin (E) | E-1 | | 8 | | | | | |
| | E-2 | | | | | | | 8 |
| | E-3 | | | | | | 4 | |
| Curing accelerator (F) | F-1 | 0.1 | 0.1 | 0.1 | 0.1 | 0.1 | 0.1 | 0.1 |
| Additive (G) | G-1 | 0.3 | 0.3 | 0.3 | 0.3 | 0.3 | 0.3 | 0.3 |
| | G-2 | 0.2 | 0.2 | 0.2 | 0.2 | 0.2 | 0.2 | 0.2 |
| | G-3 | 0.4 | 0.4 | 0.4 | 0.4 | 0.4 | 0.4 | 0.4 |
| | G-4 | 3 | 3 | 3 | 3 | 3 | 3 | 3 |
| Sum | | 100 | 100 | 100 | 100 | 100 | 100 | 100 |
| Particle size of agglomerated stress reliever (nm) | | <1,000 | <600 | <1,000 | <1,400 | <1,000 | <600 | <600 |

TABLE 2

| Component (Unit: wt %) | | Experimental Example 8 | Experimental Example 9 | Experimental Example 10 | Experimental Example 11 | Experimental Example 12 | Experimental Example 13 |
|---|---|---|---|---|---|---|---|
| Epoxy resin (A) | A-1 | 7.8 | 6.48 | 6.48 | 7.54 | 7.8 | 6.48 |
| Curing agent (B) | B-1 | 4.2 | 3.52 | 3.52 | 4.06 | 4.2 | 3.52 |
| Filler (C) | C-1 | 84 | 84 | 84 | 84 | 73 | 84 |
| Stress reliever (D) | D-1 | | | | 0.4 | 11 | |
| | D-2 | | | 2 | | | |
| | D-3 | | 2 | | | | |
| | D-4 | | | | | | 2 |
| Pre-dispersion resin (E) | E-1 | | | | | | |
| | E-2 | | | | | | |
| | E-3 | | | | | | |
| Curing accelerator (F) | F-1 | 0.1 | 0.1 | 0.1 | 0.1 | 0.1 | 0.1 |
| Additive (G) | G-1 | 0.3 | 0.3 | 0.3 | 0.3 | 0.3 | 0.3 |
| | G-2 | 0.2 | 0.2 | 0.2 | 0.2 | 0.2 | 0.2 |
| | G-3 | 0.4 | 0.4 | 0.4 | 0.4 | 0.4 | 0.4 |
| | G-4 | 3 | 3 | 3 | 3 | 3 | 3 |
| Sum | | 100 | 100 | 100 | 100 | 100 | 100 |
| Particle size of agglomerated stress reliever (nm) | | — | >5,000 | >2,100 | <800 | <1,700 | <1,600 |

Epoxy resin A-1: Ortho cresol novolac-type epoxy resin (soft point 62° C., epoxy equivalent weight 201 g/eq., melt viscosity (150° C.) 0.3 poise)

Curing agent B-1: Phenolic resin (soft point 84° C., epoxy equivalent weight 107 g/eq., melt viscosity (150° C.) 2.0 poise)

Filler C-1: Silica (average particle diameter 19.9 μm)

Stress reliever D-1: Core-shell (average particle diameter: 250 nm, core: co-polymer siloxane, shell: ACRYL)

Stress reliever D-2: Core-shell (average particle diameter: 200 nm, core: BUTADIENE, shell: ACRYL)

Stress reliever D-3: Powder (average particle diameter: 2 um, silicone particles)

Stress reliever D-4: Core-shell (average particle diameter: 430 nm, core: BUTADIENE, shell: ACRYL)

Pre-dispersion resin E-1: Stress reliever pre-dispersion resin of Preparation Example 1 (soft point 66° C., epoxy equivalent weight 251 g/eq, melt viscosity (150° C.) 6.0 poise)

Pre-dispersion resin E-2: Stress reliever pre-dispersion resin of Preparation Example 2

Pre-dispersion resin E-3: Stress reliever pre-dispersion resin of Preparation Example 3

Curing accelerator F-1: Imidazole-based curing accelerator

Additive G-1: Carbon black

Additive G-2: Carnauba wax

Additive G-3: Epoxy silane

Additive G-4: Aluminum hydroxide

[Properties Evaluation]

The properties of the epoxy resin composition prepared in each experimental example were measured as follows, and the results are shown in Tables 3 and 4 below.

Preparing Specimen

A kneaded product of the epoxy resin composition prepared in each experimental example was molded in a transfer molding manner at 175° C. for 120 seconds to form a specimen for the properties evaluation, and post-cured at 175° C. for 4 hours.

Spiral Flow

Using a mold for evaluation according to EMMI-1-66, the spiral flow was measured with a transfer molding press (175° C., 70 kgf/cm 2).

Elastic Modulus/Strength

Four identical specimens of 125 mm×12.5 mm×6 mmT were prepared, and the elastic modulus and strength thereof were measured in a universal test machine UTM 3 point bending manner (distance between support spans: 100 mm, crosshead speed: 2.8 mm/min).

Glass Transition Temperature/Thermal Expansion Coefficient

Specimens of the same size were molded and measured for the glass transition temperature from room temperature to 300° C. at a temperature increase rate of 10° C./min with a Thermo-mechanical analyzer (TMA) using an onset point technique. In addition, the thermal expansion coefficient was measured based on the range of 80° C. to 120° C.

Ag Peeling

Using the Multi gang pot (MGP) equipment as a Ag-plated general-purpose lead frame, a TO-247 package was molded. The molded package was post-cured, and subjected to a 260° C. IR reflow process for five times, and then the internal peeling was confirmed using scanning acoustic tomography (SAT).

TABLE 3

| | | Experimental Example 1 | Experimental Example 2 | Experimental Example 3 | Experimental Example 4 | Experimental Example 5 | Experimental Example 6 | Experimental Example 7 |
|---|---|---|---|---|---|---|---|---|
| Spiral flow (inch) | | 38 | 36 | 42 | 34 | 43 | 41 | 37 |
| Elastic modulus (GPa) | 30° C. | 17.3 | 15.4 | 16.2 | 13 | 16.6 | 16.1 | 15.9 |
| | 260° C. | 1.1 | 0.9 | 1 | 0.7 | 1 | 0.9 | 1 |
| Strength (MPa, 30° C.) | | 138 | 140 | 135 | 124 | 136 | 140 | 138 |
| Glass transition temperature (° C.) | | 174 | 172 | 174 | 168 | 173 | 175 | 173 |
| Thermal expansion coefficient (ppm/° C.) | | 16 | 16 | 17 | 20 | 17 | 17 | 17 |
| Ag peeling (ea) | | 5/20 | 0/20 | 3/20 | 3/20 | 5/20 | 1/20 | 1/20 |

TABLE 4

| | | Experimental Example 8 | Experimental Example 9 | Experimental Example 10 | Experimental Example 11 | Experimental Example 12 | Experimental Example 13 |
|---|---|---|---|---|---|---|---|
| Spiral flow (inch) | | 45 | 39 | 33 | 45 | 31 | 40 |
| Elastic modulus (GPa) | 30° C. | 21.2 | 19.2 | 18.1 | 20.4 | 12.9 | 18.3 |
| | 260° C. | 1.2 | 1.1 | 1 | 1.2 | 0.6 | 1.1 |
| Strength (Mpa, 30° C.) | | 141 | 115 | 122 | 141 | 117 | 125 |
| Glass transition temperature (° C.) | | 176 | 171 | 170 | 175 | 163 | 170 |
| Thermal expansion coefficient (ppm/° C.) | | 16 | 16 | 16 | 16 | 22 | 16 |
| Ag peeling (ea) | | 20/20 | 20/20 | 12/20 | 16/20 | 2/20 | 12/20 |

As confirmed from the results of Tables 3 and 4, Experimental Examples 1 to 7 according to the present invention exhibited excellent properties in all measurement items. Particularly, Experimental Examples 2, 6, and 7 in which the stress reliever was pre-dispersed in the epoxy resin or the curing agent and used exhibited particularly excellent strength and peeling resistance.

On the other hand, Experimental Example 8 in which no stress reliever was used, Experimental Examples 9, 10, 12, and 13 in which the particle size of the agglomerated stress reliever was out of the scope of the present invention, and Experimental Examples 11 and 12 in which the content of the stress reliever was out of the scope of the present invention exhibited poor properties compared to Experimental Examples 1 to 7.

INDUSTRIAL AVAILABILITY

An epoxy resin composition of the present invention achieves stable dispersion by appropriately controlling the particle size of a stress reliever agglomerated in a kneaded product after knead-melting, and thus, has an effect in that the thermal stress of constituent materials of a material to be molded or between the constituent materials is relieved, thereby preventing the occurrence of peeling or cracking between the constituent materials of the material to be molded, and the breakage of the material to be molded or the constituent materials. In addition, the epoxy resin composition according to the present invention may improve the heat resistance, low-stress properties, and moisture resistance of a semiconductor device or vehicle part sealed using the same, thereby providing high reliability.

The invention claimed is:

1. An epoxy resin composition for molding, comprising an epoxy resin, a curing agent, a filler and a stress reliever, wherein a particle size of the stress reliever agglomerated in a knead product prepared by melt-kneading the epoxy resin composition is 1,500 nm or less when measured using a scanning electron microscope (SEM), wherein based on the total weight of the epoxy resin composition, 2 wt % to 20 wt % of the epoxy resin, 1 wt % to 20 wt % of the curing agent, 63 wt % to 91 wt % of the filler, and 0.5 wt % to 10 wt % of the stress reliever are included.

2. The epoxy resin composition for molding of claim 1, wherein the stress reliever has a core-shell structure, wherein:

a core of the stress reliever comprises one or more selected from the group consisting of butadienes, butadiene copolymers, (meth)acrylates, and siloxanes; and a shell of the stress reliever comprises one or more selected from the group consisting of a (meth)acrylate polymer and an acrylate copolymer.

3. The epoxy resin composition for molding of claim 2, wherein one or more of the (meth)acrylate polymer and the acrylate copolymer constituting the shell is surface-treated with an organic/inorganic functional group.

4. The epoxy resin composition for molding of claim 1, wherein some or all of the stress reliever is pre-dispersed in a resin for pre-dispersion to form a pre-dispersed resin composition, and then the pre-dispersed resin composition is introduced into the epoxy resin composition, wherein the resin for pre-dispersion is one or more of some or all of the epoxy resin; and some or all of the curing agent.

5. The epoxy resin composition for molding of claim 4, wherein based on the total weight of the pre-dispersed resin composition, 5 wt % to 50 wt % of the stress reliever is included.

6. The epoxy resin composition for molding of claim 1, wherein the epoxy resin composition has an elastic modulus of 11 GPa to 20 GPa measured in a universal test machine UTM 3 point bending manner at 30° C.

7. A semiconductor device sealed using the epoxy resin composition according to claim 1.

8. A vehicle part molded using the epoxy resin composition according to claim 1.

* * * * *